United States Patent
Yoshikawa et al.

(10) Patent No.: US 6,249,356 B1
(45) Date of Patent: Jun. 19, 2001

(54) COMMUNICATION TERMINAL DEVICE

(75) Inventors: Hiroyasu Yoshikawa, Kyotanabe; Taku Soneoka, Uji, both of (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/088,403

(22) Filed: Jun. 1, 1998

(30) Foreign Application Priority Data

Jun. 5, 1997 (JP) .................................................. 9-147376

(51) Int. Cl.[7] ....................................................... H04N 1/00
(52) U.S. Cl. .................... 358/402; 358/1.16; 358/400; 358/403; 358/404; 358/434
(58) Field of Search .................... 358/400, 402, 358/403, 404, 440, 434, 405, 401, 406, 439, 1.16, 1.15; 340/825.44

(56) References Cited

U.S. PATENT DOCUMENTS

| 5,127,047 | 6/1992 | Bell et al. . | |
|---|---|---|---|
| 5,155,601 | * 10/1992 | Toyama | 358/401 |
| 5,224,156 | 6/1993 | Fuller et al. . | |
| 5,225,826 | * 7/1993 | DeLuca et al. | 340/825.44 |
| 5,283,665 | * 2/1994 | Ogata | 358/434 |
| 5,291,302 | * 3/1994 | Gordon et al. | 358/404 |
| 5,555,346 | * 9/1996 | Gross et al. | 706/45 |

FOREIGN PATENT DOCUMENTS

| 0586906 | 3/1994 | (EP) . |
| 0773664 | 5/1997 | (EP) . |
| WO 94/24808 | 10/1994 | (WO) . |

* cited by examiner

Primary Examiner—Edward Coles
Assistant Examiner—Mark Wallerson
(74) Attorney, Agent, or Firm—Hogan & Hartson, LLP.

(57) ABSTRACT

When confidential data is received in an empty mailbox of a facsimile machine, a receipt notification is printed out from a printer or displayed in a screen. However, if there is old data stored in the same mailbox, a receipt notification is not printed nor displayed.

8 Claims, 3 Drawing Sheets

FIG. 3(a)

| MAILBOX NO. | MAILBOX NAME | SECRET CODE |
|---|---|---|
| 1 | SUZUKI | 1234 |
| 2 | SATOH | 5678 |
| 3 | TANAKA | 0987 |
| ⋮ | ⋮ | ⋮ |

FIG. 3(b)

| DIAL – IN NUMBER | MAILBOX NO. | MAILBOX NAME |
|---|---|---|
| 1001 | 1 | DEPT. 1 SECT. 1 |
| 1002 | 2 | DEPT. 1 SECT. 2 |
| 2000 | 5 | PERSONNEL |
| ⋮ | ⋮ | ⋮ |

COMMUNICATION TERMINAL DEVICE

BACKGROUND OF THE INVENTION

1. Field of the Invention

The present invention relates to an improved communication terminal device provided with confidential reception capability or the like utilizing a memory mailbox.

2. Description of the Related Art

Conventionally, some of facsimile machines, (which is one type of communication terminal device) are provided with confidentiality capability whereby after receipt of a confidential reception request received image data is stored directly in a designated memory mailbox without being printed out. After output of notification indicating that confidential mail has been received, the stored data can be read-out and output onto a recording sheet when the predetermined secret code corresponding to that memory mailbox is entered by someone who confirms the notification. Thus, only the designated user who knows the secret code can learn the contents of the confidential image data in the corresponding box, so the secrecy of the data is maintained.

Confidential reception notification indicating receipt of confidential mail is output each time confidential data is received. Therefore, if date in a particular memory mailbox is left unattended for an extended period and confidential data continues to be received by the same memory mailbox, recording paper is wasted.

Particularly, if there is constraint on the receiving side that received data is stored in a memory mailbox as confidential data based on, for example, a dial-in number dialed by a remote device, all reception is treated as confidential whether or not the sender intended it to be sent confidentially, and so confidential reception notification messages are output more frequently.

SUMMARY OF THE INVENTION

It is an object of the present invention, taking into account the state of the conventional technology, to provide a communication terminal device that stores incoming data in a memory mailbox without printing out notification every time such data arrives.

In order to accomplish this object, in a communication terminal device according to one aspect of the present invention, if data is received and stored in a memory mailbox while the memory mailbox contains data that has yet to be output, the newly received data is stored in the memory mailbox without displaying or outputting additional information indicating such reception. On the other hand, if data is received when there is no unprinted data in the memory mailbox, reception notification is displayed or output and the data is stored in the memory.

In other words, a fact that the memory mailbox contains data which has yet to be printed out means that a reception notification message has already been displayed or printed, and there is a possibility that this notification has not yet been seen. The communication terminal device on the receiving side does not print or display a similar notification this time. The communication terminal device waits for an authorized person on the receiving side to see the printed or displayed notification and enter his or her password or secret code for printing of the already received data.

If a predetermined amount of time has elapsed since reception notification was output but the data still has not been output, the same reception notification may be printed or displayed again upon receiving new confidential data. In other words, a fact that the predetermined amount of time has elapsed without the received data being output means that the receipt notification output at the time the first data was received may have disappeared, gotten lost, or have been forgotten about. Therefore, if new data is received after the predetermined amount of time has elapsed, reception notification will again be displayed or printed.

When the received data is stored in a memory mailbox designated by the remote device, reception notification may be displayed or printed regardless of whether or not unprinted data is already stored in the mailbox. When the received data is stored in a memory mailbox based on conditions determined by the communication terminal device on the receiving side, reception notification may not be displayed or output if unprinted data is already stored in the mailbox, but reception notification may be displayed or output if unprinted data is not already stored in the mailbox. Designation of the mailbox by the remote device may be such that a mailbox number is designated at the time a confidential reception request or broadcast request is detected prior to reception of data. The predetermined conditions set by the communication terminal device on the receiving side may include those such that the memory mailbox into which received data is stored is determined or no memory box is allotted based upon a dial-in number or telephone number of the remote device.

BRIEF DESCRIPTION OF THE DRAWINGS

FIG. 3(a) is a diagram showing an example of administrative information stored in a memory mailbox of the communication terminal device shown in FIG. 1.

FIG. 3(b) is a diagram illustrating another administrative information stored in the memory mailbox.

DETAILED DESCRIPTION OF THE INVENTION

An embodiment of the present invention will be described below in reference to the accompanying drawings.

Figure 1:
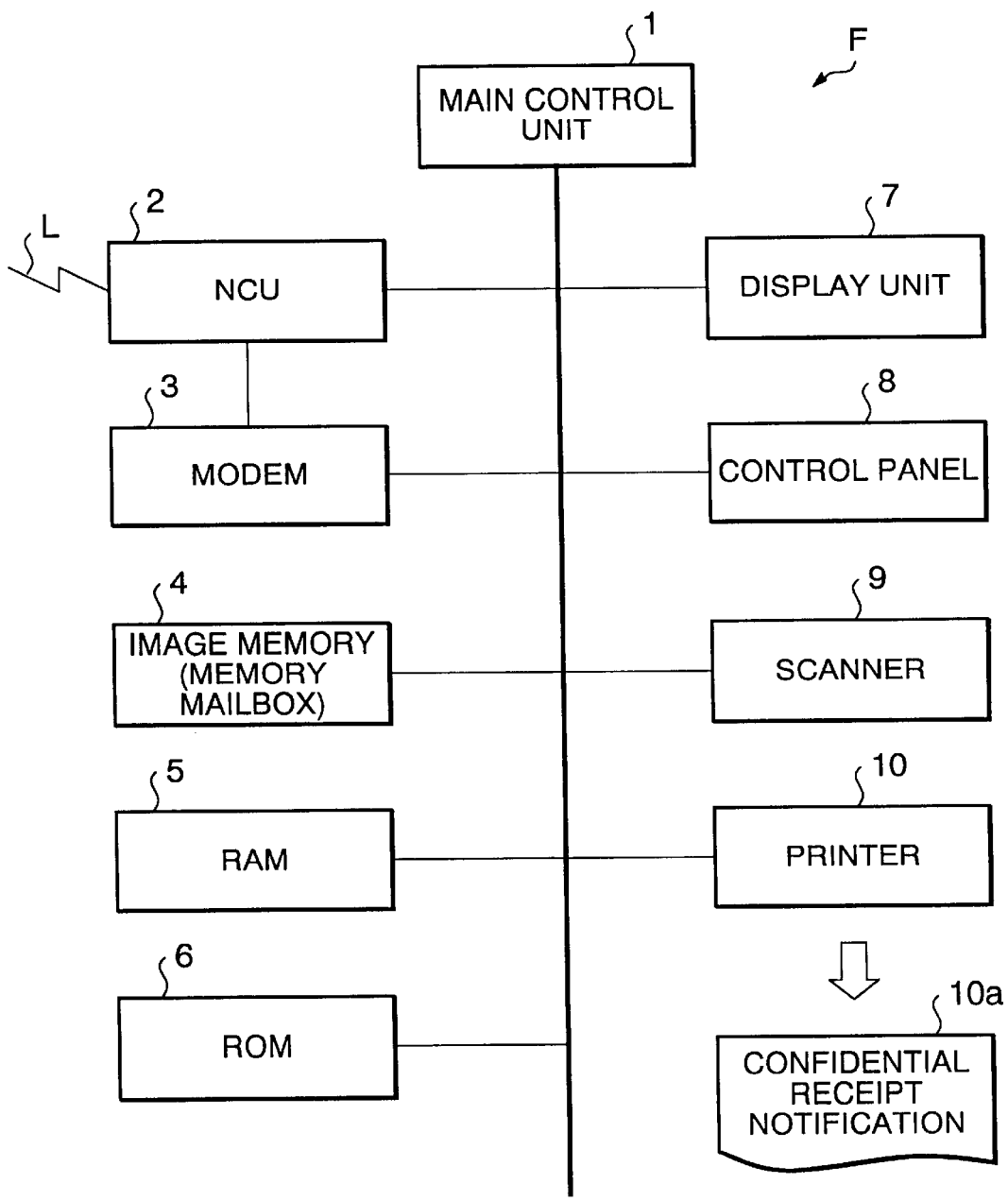
FIG. 1 is a block diagram showing an example of the structure of a communication terminal device (facsimile machine) of the present invention.

Referring to FIG. 1, illustrated is a block diagram of a communication terminal device according to the present invention in the form of facsimile machine F. The present invention is embodied in the facsimile machine F in this particular embodiment, but the present invention is applicable to any communication terminal device provided with the capability of storing in a memory data received via a telephone communication line L from a remote communication terminal device, including for example, a personal computer provided with data communication capabilities.

In the drawing, a reference numeral 1 designates a main control unit comprised of a Central Processing Unit, 2 designates an NCU for performing network control like sending dialing signals to the communication line L, 3 designates a modem for modulating and demodulating signals in order to perform facsimile communication of image data, 4 denotes an image memory provided with at least one memory mailbox for storing facsimile image data (image memory 4 hereinafter referred to as "memory mailbox(es) 4"), 5 denotes RAM for storing information used to administer or manage the memory mailboxes 4, 6 denotes ROM for storing processing programs, 7 denotes a display unit comprised of an LCD, LEDs, or the like, 8 denotes a control panel comprised of multiple function keys or switches, 9 is a scanner for scanning image data from an original document, and 10 is a printing unit for outputting image data onto recording paper. Main control unit 1 also includes one or more processing circuits for controlling facsimile communication, encoding and decoding image data, and the like.

The basic function of facsimile machine F is to encode image data scanned-in from scanner 9 and transmit it over communication line L, and decode image data received over the communication line L and output it from printing unit 10, but the illustrated facsimile machine F is also equipped with confidential reception capability for storing received image data in a particular one of memory mailboxes 4 designated by a remote communication terminal device (such as a remote facsimile machine, personal computer, or the like) over the communication line L.

When confidential data is received, information indicating this fact (for example, a message indicating "confidential mail in box 1" displayed at display unit 7; a confidential receipt notification message 10a printed out from printing unit 10; or, possibly in conjunction with the first two possibilities, a recorded (voice) message output from an internal speaker (not shown)) is output.

A person who confirms this output inputs a predetermined secret code for that particular memory mailbox 4 into the control panel 8, and the image data stored in the memory mailboxes 4 are then read out and output from printing unit 10. One secret code is assigned to one memory mailbox 4.

The present invention, however, is characterized such that a reception notification message 10a is not displayed or printed-out when unprinted data is already stored in the memory mailbox 4 when new data is received and stored in that box.

In other words, when data is received, if unprinted data is already stored in the memory mailbox 4, the newly received data is stored in the memory mailbox 4 without a new reception notification message being displayed or printed, but if there is no unprinted data stored in the memory box 4, a reception notification message 10a is displayed or printed and the newly received data is stored in the memory mailbox 4.

If unprinted data is stored in memory mailbox 4, it means that notification 10a indicating such reception has already been displayed or printed-out. In such a case, a similar notification (notification indicating arrival of another confidential data) is not printed out. Thus, once the data is stored in a memory mailbox 4, notification of the receipt of confidential data 10a is only printed once (for the first reception), and no new reception notification messages will be output until all unprinted data is printed-out, and thus wasting of recording sheets can be prevented.

In the present embodiment, one of the memory mailboxes 4 is designated by a box number specified by the remote device (the sender) in a facsimile communication protocol signal received before reception of the image data, but it is also possible for mailbox 4 to be designated by a so-called F-code which designates an individual sub-address (SUB) and password (PWD) assigned to each mailbox.

Use of the memory mailboxes 4 need not be limited to confidential reception, but can also be expanded for polling (whereby stored data is transmitted to a remote device which requests the polling), for bulletin board functions (whereby data is sent from and received into a designated memory mailbox 4), and for broadcast functions (whereby data is temporarily stored for broadcasting to other communication terminal devices).

In addition to storing confidential data in a certain memory mailbox upon mail box designation from the remote device, the facsimile machine F may determine conditions regarding storage of received data (e.g., received data should be stored in the mailboxes or not, and which mailbox should be used) based on, for example, a dial-in number dialed by the remote communication device which sends the data and the telephone number of the remote communication device. The telephone number of the remote device is detectable from a facsimile communication protocol signal. In this case, one dial-in number is assigned to one mailbox beforehand.

In other words, messages from the remote device can be allotted to and stored in different predetermined memory mailboxes 4 based on the dial-in telephone number or the telephone number of the remote device.

If memory mailboxes 4 are allotted based on dial-in telephone numbers, even when the facsimile machine F is shared by multiple users, data from the memory mailboxes assigned to each user or user group can be read out and printed onto recording sheets by the printer unit 10, thus enabling users or user groups to output only messages addressed to them. Further, if memory mailboxes 4 are allotted based on telephone numbers, data sent from an important sender can be automatically treated as confidential by the facsimile machine F on the receiving side.

The operation described above is shown in the flow chart of FIG. 2.

Herein, when received data is stored in memory mailbox 4, there are two possibilities: (1) the memory mailbox 4 into which received data is stored is designated by way of a predetermined dial-in number and (2) the receiving device is enabled to store the received data in the designated memory mailbox 4 when a request for confidential reception is received from the remote device.

After receiving a call (Step 100), if a dial-in number is detected (Step 101), the received data is stored in a memory mailbox 4 (Steps 102 and 103). Next, if there is no unprinted data stored in the memory mailbox 4 before reception (Step 104), a confidential reception notification message boa is output from the printing unit 10 (Step 105). If, on the other hand, unprinted data exists in the memory mailbox 4, a confidential reception notification message boa is not printed (Step 104).

If the dial-in number is not detected at step 101 but a request for confidential reception is received (Step 106), then after storing the received data in a memory mailbox 4 (Steps 107 and 108), a confidential reception notification message 10a is printed without fail (Step 109). If a request for confidential reception is not detected, the data is received via the usual facsimile reception method (Step 110) and is thus printed out from printing unit 10 without being stored in a memory mailbox 4 (Step 111).

Figure 2:
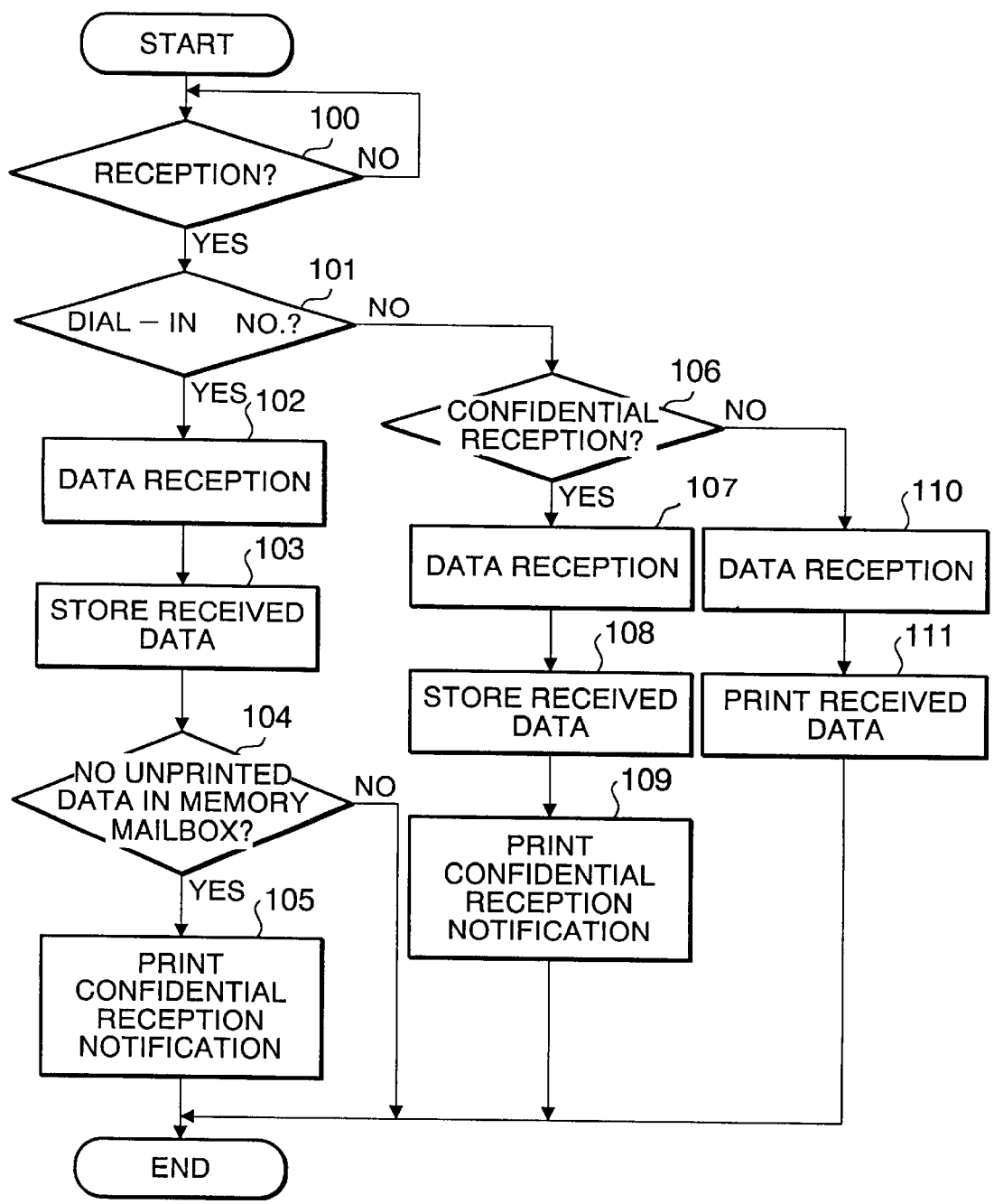
FIG. 2 is a flow chart showing an example of the basic operations of the communication terminal device shown in FIG. 1.

In other words, the operation shown in FIG. 2 is such that when received data is stored in a memory mailbox 4 designated by the remote device, a confidential reception notification message 10a is always displayed or printed regardless of whether or not there is unprinted data in the mailbox 4. On the other hand, if data is received and stored in a memory mailbox 4 in accordance with the predetermined conditions set by the facsimile machine F, reception notification 10a is displayed or printed as long as there is no unprinted data already in the mailbox 4.

In general, when the remote communication device specifies a particular mailbox and sends data, the data is addressed to a particular individual. Therefore, the facsimile machine F always prints a notification 10*a* (every time confidential reception occurs) to promptly inform this individual that a confidential mail is received so that the individual can quickly acquire the transmitted data from the mailbox.

Information stored in RAM 5 in order to manage the memory mailboxes 4 is comprised such as what is shown in FIG. 3(*a*). When a user of the facsimile machine F sees the confidential reception notification message 10*a* indicating that confidential data is delivered to his or her mailbox, he or she enters a secret code set for the mailbox 4 to retrieve all of the unprinted data from the mailbox 4 and has the data printed on a recording sheet.

In general, when the facsimile machine F determines by the dial-in number which mailbox should be used for data reception, necessity of printing out a confidential reception notification message 10*a* for each message is relatively lower, and such output is only printed when there is no unprinted data remaining in the mailbox.

In this case, information for the management of the memory mailboxes 4 is comprised as shown in FIG. 3(*b*). Herein, each mailbox 4 is assigned to a different department, and when a user finds a reception notification message boa indicating that a message has been received at a memory mailbox 4 allotted to his or her department, he or she can have the data read-out from the memory mailbox and printed out onto a recording sheet by performing a predetermined procedure on the control panel 8.

At this time, since all the unprinted data is printed out at once, the user need only perform the printing procedure once. When new data is stored in the mailbox 4 after printing, the facsimile machine F has returned to a condition in which no unprinted data is stored in the mailbox so that a receipt notification message is printed out.

It should be noted that the present invention is not limited to the described and illustrated embodiment.

For example, if data is stored in a memory mailbox 4 over a predetermined time (e.g., 12 hours) after printing a reception notification message 10*a,* the same confidential reception notification message 10*a* may be printed out again promptly or the same confidential notification 10*a* may be printed upon receiving new data. If the data is stored in an empty memory mailbox 4 based on a certain dial-in number, a receipt notification is printed out or displayed. However, if new data is stored in the same memory mailbox, a receipt notification messages 10*a* will not be output as long as the old data is present in the mailbox. This situation possibly means that the printed notification fails to reach the intended recipient. Hence, after a predetermined amount of time has passed from the time when the first notification message 10*a* is output, the same notification message 10*a* is re-output in order to protect against the received data from being read-out too late.

It is also satisfactory to output another receipt notification indicating receipt of new data after the predetermined amount of time has elapsed, instead of or in addition to printing the same notification again.

The description above deals with the case where the communication terminal device of the present embodiment is a facsimile machine F, but in the case where the communication terminal device is a personal computer, receipt notification can be output on a CRT display or printed out from a connected printer. Further, determination of whether or not to output the receipt notification can be determined not just in relation to whether unprinted data exists in the memory mailbox 4, but also based on whether or not the mail memory box 4 has been accessed or not.

The communication terminal device is disclosed in Japanese Patent Application No. 9-147376 filed Jun. 5, 1997 in JPO and the entire disclosure thereof is incorporated herein by reference.

What is claimed is:

1. A communication terminal device having at least one memory mailbox, wherein if data is received in a memory mailbox while the memory mailbox contains data that has yet to be printed out, the data being received is stored in the memory mailbox without outputting information indicating such receipt, and if data is received in a memory mailbox while the memory mailbox does not contain data that has yet to be printed-out, information indicating such receipt is output and the data is stored in the memory mailbox, and wherein if a predetermined amount of time has elapsed since reception notification is output at the time of data reception without the data being printed-out, another reception notification indicating arrival of new data is output when new data reception takes place after the predetermined amount of time has elapsed.

2. A communication terminal device having at least one memory mailbox, wherein if data is received in a memory mailbox while the memory mailbox contains data that has yet to be printed out, the data being received is stored in the memory mailbox without outputting information indicating such receipt, and if data is received in a memory mailbox while the memory mailbox does not contain data that has yet to be printed-out, information indicating such receipt is output and the data is stored in the memory mailbox, and wherein if a predetermined amount of time has elapsed since reception notification is output at the time of data reception without the data being printed-out, same reception notification is output again.

3. A communication terminal device having at least one memory mailbox, wherein when received data is stored in a memory mailbox designated by a remote device, reception notification is output regardless of whether or not data that has yet to be printed-out is stored in the mailbox, and wherein when received data is stored in a memory mailbox according to conditions determined by the communication terminal device, newly received data is stored in a memory mailbox without outputting reception notification if data that has yet to be printed-out is stored in the memory mailbox whereas newly received data is stored in a memory mailbox and reception notification is output if there is no data that has yet to be printed-out stored in the mailbox, and wherein after a predetermined amount of time has elapsed since reception notification is output at the time of data reception without the data being printed out, another reception notification indicating arrival of new data is output when new data reception takes place after the predetermined amount of time has elapsed.

4. A communication terminal device having at least one memory mailbox, wherein when received data is stored in a memory mailbox designated by a remote device, reception notification is output regardless of whether or not data that has yet to be printed-out is stored in the mailbox, and wherein when received data is stored in a memory mailbox according to conditions determined by the communication terminal device, newly received data is stored in a memory mailbox without outputting reception notification if data that has yet to be printed-out is stored in the memory mailbox whereas newly received data is stored in a memory mailbox and reception notification is output if there is no data that has yet to be printed-out stored in the mailbox, and wherein if a predetermined amount of time has elapsed since reception notification is output at the time of data reception without the data being printed-out, same reception notification is output again.

5. A communication terminal device adapted to receive data from a remote communication terminal, comprising:

at least one memory mailbox for storing data;

first output means for outputting information about data reception only if the data is stored in an empty mailbox; and third output means for outputting same information about data reception if a predetermined amount of time has elapsed since the first output means outputs the information about data reception without the data being printed out from the communication terminal device.

6. A communication terminal device adapted to receive data from a remote communication terminal, comprising:

at least one memory mailbox for storing data;

first output means for outputting information about data reception only if the data is stored in an empty mailbox; and fourth output means for outputting another information about new data reception if a predetermined amount of time has elapsed since the first output means outputs the information about data reception without the data being printed out from the communication terminal device and new data is received.

7. The communication terminal device of claim 5, wherein the third output means includes a display, a printer and/or a voice message generator.

8. The communication terminal device of claim 6, wherein the fourth output means includes a display, a printer and/or a voice message generator.

* * * * *